United States Patent
Arora et al.

(10) Patent No.: US 10,691,516 B2
(45) Date of Patent: Jun. 23, 2020

(54) MEASUREMENT AND VISUALIZATION OF RESILIENCY IN A HYBRID IT INFRASTRUCTURE ENVIRONMENT

(71) Applicant: International Business Machines Corporation, Armonk, NY (US)

(72) Inventors: Pritpal S. Arora, Bangalore (IN); Bijo S. Kappen, Bangalore (IN); Gopal S. Pingali, Mohegan Lake, NY (US); Adinarayana Sakala, Tirupati (IN)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 15/479,382

(22) Filed: Apr. 5, 2017

(65) Prior Publication Data

US 2018/0293120 A1    Oct. 11, 2018

(51) Int. Cl.
*G06F 11/30*    (2006.01)
*G06F 11/00*    (2006.01)
*G06F 11/34*    (2006.01)
*G06Q 10/06*    (2012.01)

(52) U.S. Cl.
CPC ........ *G06F 11/008* (2013.01); *G06F 11/3006* (2013.01); *G06F 11/3051* (2013.01); *G06F 11/3495* (2013.01); *G06Q 10/0635* (2013.01)

(58) Field of Classification Search
None
See application file for complete search history.

(56) References Cited

U.S. PATENT DOCUMENTS

| | | | |
|---|---|---|---|
| 8,422,399 B2* | 4/2013 | Gorman | H04L 41/22 370/254 |
| 10,176,032 B2* | 1/2019 | Horrell | G06F 11/0751 |
| 2005/0105475 A1* | 5/2005 | Norrgard | H04L 41/0213 370/254 |
| 2008/0281650 A1 | 11/2008 | Lotlikar et al. | |
| 2014/0047002 A1 | 2/2014 | Plant | |
| 2014/0156323 A1 | 6/2014 | Prieto | |
| 2015/0227444 A1* | 8/2015 | Tseitlin | G06F 11/36 714/32 |
| 2015/0301882 A1* | 10/2015 | Liao | G05B 19/4184 714/47.3 |

FOREIGN PATENT DOCUMENTS

| | | |
|---|---|---|
| CA | 2493525 A1 | 2/2004 |
| WO | 2014078457 A1 | 5/2014 |
| WO | 2014130474 A1 | 8/2014 |
| WO | 2014145579 A2 | 9/2014 |

OTHER PUBLICATIONS

F.D. Petit, Resilience Measurement Index: An Indicator of Critical Infrastructure Resilience, Apr. 2013, Argonne National Laboratory (Year: 2013).*

* cited by examiner

*Primary Examiner* — Alan S Miller
*Assistant Examiner* — Arif Ullah
(74) *Attorney, Agent, or Firm* — Brown & Michaels, PC; Christopher Pignato

(57) ABSTRACT

Automatic computation of a resilience of a hybrid IT infrastructure environment based on a variety of factors including resilience of individual architectural components in combination with the business criticality of each of those components.

20 Claims, 8 Drawing Sheets

MEASUREMENT AND VISUALIZATION OF RESILIENCY IN A HYBRID IT INFRASTRUCTURE ENVIRONMENT

BACKGROUND

The present invention relates to hybrid information technology infrastructure environments, and more specifically to measurement and visualization of resiliency in a hybrid information (IT) infrastructure environment.

Large and complex enterprise hybrid IT systems consist of several components and workloads each running under various platforms and/or hosted by various cloud service providers and contain complex interdependencies. Each of the workloads have varying criticality for businesses depending on the business function the workload supports.

Current systems and methods provide for resilience calculations at application level or system/sub-system levels only. The current measurement of resilience takes into account factors of availability and downtimes only, and do not account for multiple other enterprise considerations such as monitoring status, component recover abilities, and backups. Furthermore, the severity and extent of impact for outages is not considered when measuring resilience of the systems/applications or sub-systems.

SUMMARY

According to one embodiment of the present invention, a method of evaluating and measuring resilience of a multi-site, multi-vendor hybrid information technology infrastructure environment using a resilience measurement module is disclosed. The method comprising the steps of: the resilience measurement module constructing a service level to component level mapping structure; the resilience measurement module assigning a business component criticality index to each business component of the hybrid information technology infrastructure environment to construct a business component to technical component mapping structure; the resilience measurement module assigning a technical component criticality index to technical components of the business component to technical component mapping structure based on importance and impact of failure of said components to identify critical technical components and critical business components to the hybrid information technology infrastructure environment; the resilience measurement module identifying single points of failure of the critical technical components and critical business components of the hybrid information technology infrastructure environment; the resilience measurement module calculating an availability vulnerability weighted score of the critical technical components and critical business components; the resilience measurement module determining a recoverability factor for each of the critical business components and critical technical components identified; the resilience measurement module measuring downtime and availability to determine a performance vulnerability score; the resilience measurement module computing a backup vulnerability score for backup methodology of the identified, critical business components and critical technical components; the resilience measurement module determining an impact analysis score; and the resilience measurement module constructing a risk charter with red, amber, and green status exhibiting the resilience of the hybrid information technology environment infrastructure.

According to another embodiment of the present invention, a computer program product for evaluating and measuring resilience of a multi-site, multi-vendor hybrid information technology infrastructure environment using a resilience measurement module is disclosed. The resilience measurement module comprising at least one processor, one or more memories, one or more computer readable storage media, the computer program product comprising a computer readable storage medium having program instructions embodied therewith. The program instructions executable by the computer to perform a method comprising: constructing, by the resilience measurement module, a service level to component level mapping structure; assigning, by the resilience measurement module, a business component criticality index to each business component of the hybrid information technology infrastructure environment to construct a business component to technical component mapping structure; assigning, by the resilience measurement module, a technical component criticality index to technical components of the business component to technical component mapping structure based on importance and impact of failure of said components to identify critical technical components and critical business components to the hybrid information technology infrastructure environment; identifying, by the resilience measurement module, single points of failure of the critical technical components and critical business components of the hybrid information technology infrastructure environment; calculating, by the resilience measurement module, an availability vulnerability weighted score of the critical technical components and critical business components; determining, by the resilience measurement module, a recoverability factor for each of the critical business components and critical technical components identified; measuring, by the resilience measurement module, downtime and availability to determine a performance vulnerability score; computing, by the resilience measurement module, a backup vulnerability score for backup methodology of the identified, critical business components and critical technical components; determining, by the resilience measurement module, an impact analysis score; and constructing, by the resilience measurement module, a risk charter with red, amber, and green status exhibiting the resilience of the hybrid information technology environment infrastructure.

According to another embodiment of the present invention, a computer system for evaluating and measuring resilience of a multi-site, multi-vendor hybrid information technology infrastructure environment using a resilience measurement module is disclosed. The system comprising a computer comprising at least one processor, one or more memories, one or more computer readable storage media having program instructions executable by the computer to perform the program instructions. The program instructions comprising: constructing, by the resilience measurement module, a service level to component level mapping structure; assigning, by the resilience measurement module, a business component criticality index to each business component of the hybrid information technology infrastructure environment to construct a business component to technical component mapping structure; assigning, by the resilience measurement module, a technical component criticality index to technical components of the business component to technical component mapping structure based on importance and impact of failure of said components to identify critical technical components and critical business components to the hybrid information technology infrastructure environment; identifying, by the resilience measurement module, single points of failure of the critical technical components and critical business components of the hybrid information technology infrastructure environment; calculating, by the resilience measurement module, an availability vulnerability weighted score of the critical technical components and critical business components; determining, by the resilience measurement module, a recoverability factor for each of the critical business components and critical technical components identified; measuring, by the resilience measurement module, downtime and availability to determine a performance vulnerability score; computing, by the resilience measurement module, a backup vulnerability score for backup methodology of the identified, critical business components and critical technical components; determining, by the resilience measurement module, an impact analysis score; and constructing, by the resilience measurement module, a risk charter with red, amber, and green status exhibiting the resilience of the hybrid information technology environment infrastructure.

DETAILED DESCRIPTION

Figure 1:
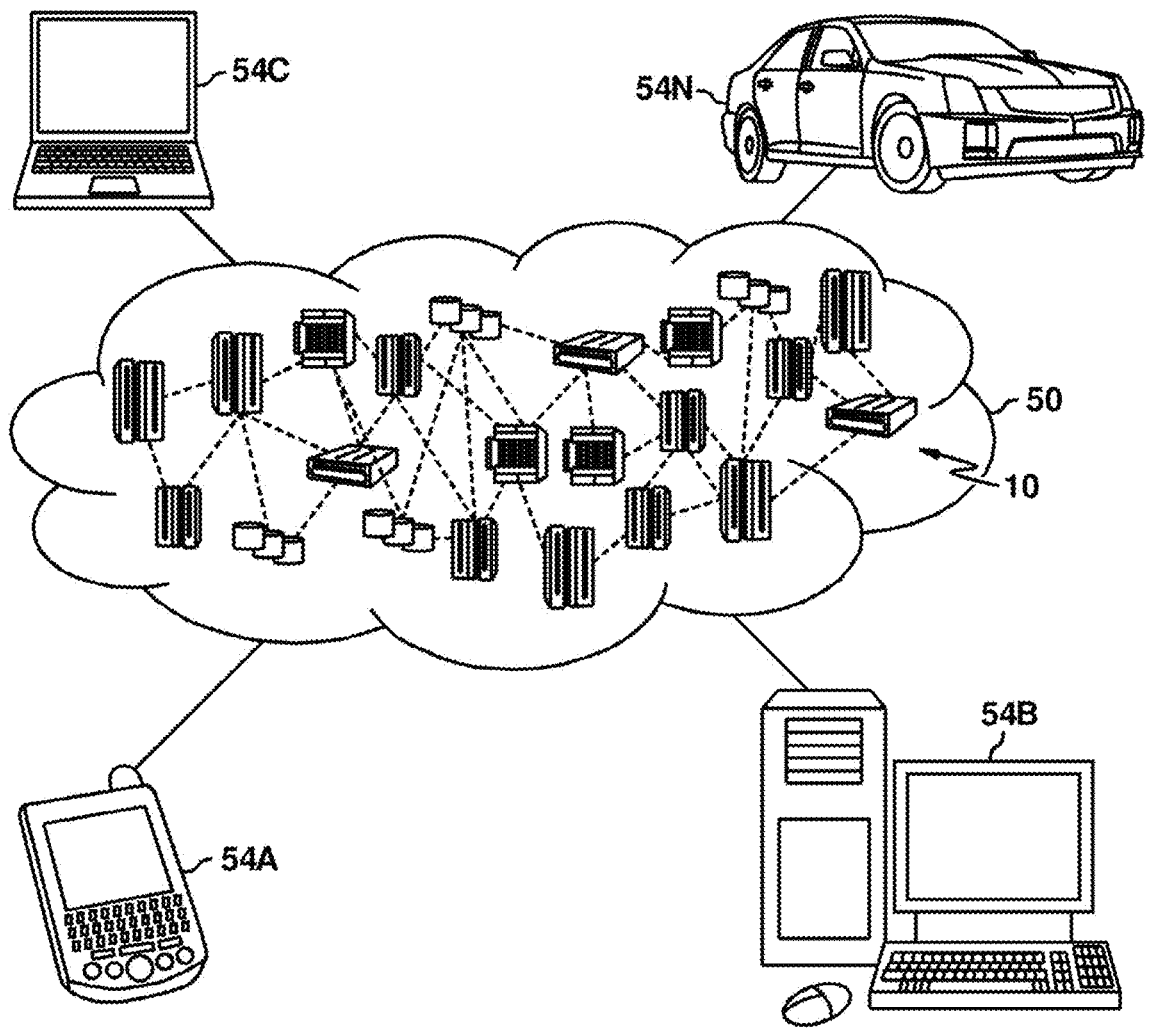
FIG. 1 depicts a cloud computing node according to an embodiment of the present invention.

In an embodiment of the present invention, automatic computation of a resilience of a hybrid information technology (IT) infrastructure environment is based on a variety of factors including resilience of individual architectural components in combination with the business criticality of each of those components.

In another embodiment of the present invention, the resilience of the dynamic workloads across multiple platforms and XaaS providers is computed, an enterprise wide resilience score for the hybrid IT infrastructure environment is computed, a risk charter based on the resilience computed is correlated and built, and resilience of technical components of business components is modeled and mapped.

In an embodiment of the present invention, infrastructure resilience score is a measurement of the infrastructure resistance and immunity to failure/outages with an effort to meet minimum service level agreements and performance characteristics. The infrastructure resilience score is computed on a per component basis in the entire hybrid IT infrastructure environment with the following factors influencing the resilience: high availability of the components and single point of failures; success of the backups and agility of restoring the infrastructure environment from failures; time for recoverability of the components; performance metrics; performance metrics; and predictive monitoring for outage of components.

In an embodiment of the present invention, the overall resilience of a hybrid IT infrastructure environment is automatically computed as a weighted combination of an availability vulnerability score, a recoverability score/factor, a performance vulnerability score, a monitoring score, and a backup vulnerability score of each technical component in the hybrid IT infrastructure environment.

In another embodiment of the present invention, the vulnerability hotspots and risk based visualizations across the hybrid IT infrastructure environment are automatically generated to correlate various architecture views (business, technology and component) and based on dimensions such as availability, single points of failure (SPOFs), recoverability, backup and performance history.

In another embodiment, technical components are automatically identified which are SPOFs by analyzing the designs and technical architectural elements needed to realize a business service.

In another embodiment, a library of pattern based SPOFs of a network, storage, compute components are derived by relating failures and applying rules of redundancy check-sets (such as duality of servers, storage, middleware components, etc.)

In yet another embodiment, the resilience is correlated across the components in various arch views and generate dynamic navigable risk and resilience views with ability to roll-down and roll-up across architecture views (business/technical).

It is to be understood that, although this disclosure includes a detailed description on cloud computing, implementation of the teachings recited herein are not limited to a cloud computing infrastructure environment. Rather, embodiments of the present invention are capable of being implemented in conjunction with any other type of computing infrastructure environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting infrastructure environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Everything-as-a-Service (XaaS): the capability provided to the consumer is a single service or collection of services that are delivered to the client over the internet. The most common examples are software (SaaS), infrastructure (IaaS), and platform (PaaS), but virtually every layer of the IT stack can be offered as a service.

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing infrastructure environment is service oriented with a focus on statelessness, low coupling, modularity, and semantic interoperability. At the heart of cloud computing is an infrastructure that includes a network of interconnected nodes.

Referring now to FIG. 1, illustrative cloud computing infrastructure environment 50 is depicted. As shown, cloud computing infrastructure environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing infrastructure environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing infrastructure environment 50 can communicate with any type of computerized device over any type of network and/or network addressable connection (e.g., using a web browser).

Figure 2:
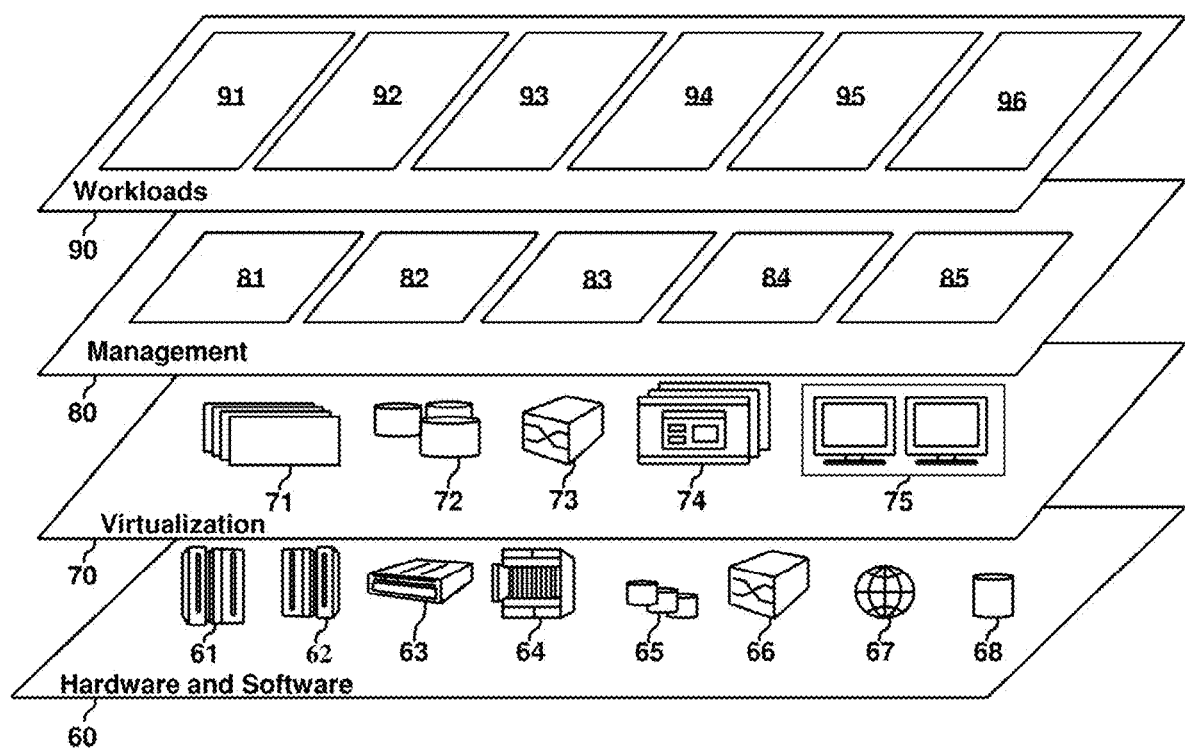
FIG. 2 depicts abstraction model layers according to an embodiment of the present invention.

Referring now to FIG. 2, a set of functional abstraction layers provided by cloud computing infrastructure environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing infrastructure environment. Metering and Pricing 82 provide cost tracking as resources are utilized within the cloud computing infrastructure environment, and billing or invoicing for consumption of these resources. In one example, these resources may include application software licenses. Security provides identity verification for cloud consumers and tasks, as well as protection for data and other resources. User portal 83 provides access to the cloud computing infrastructure environment for consumers and system administrators. Service level management 84 provides cloud computing resource allocation and management such that required service levels are met. Service Level Agreement (SLA) planning and fulfillment 85 provide prearrangement for, and procurement of, cloud computing resources for which a future requirement is anticipated in accordance with an SLA.

Workloads layer 90 provides examples of functionality for which the cloud computing infrastructure environment may be utilized. Examples of workloads and functions which may be provided from this layer include: mapping and navigation 91; software development and lifecycle management 92; virtual classroom education delivery 93; data analytics processing 94; transaction processing 95; and resiliency processing 96.

Figure 3:
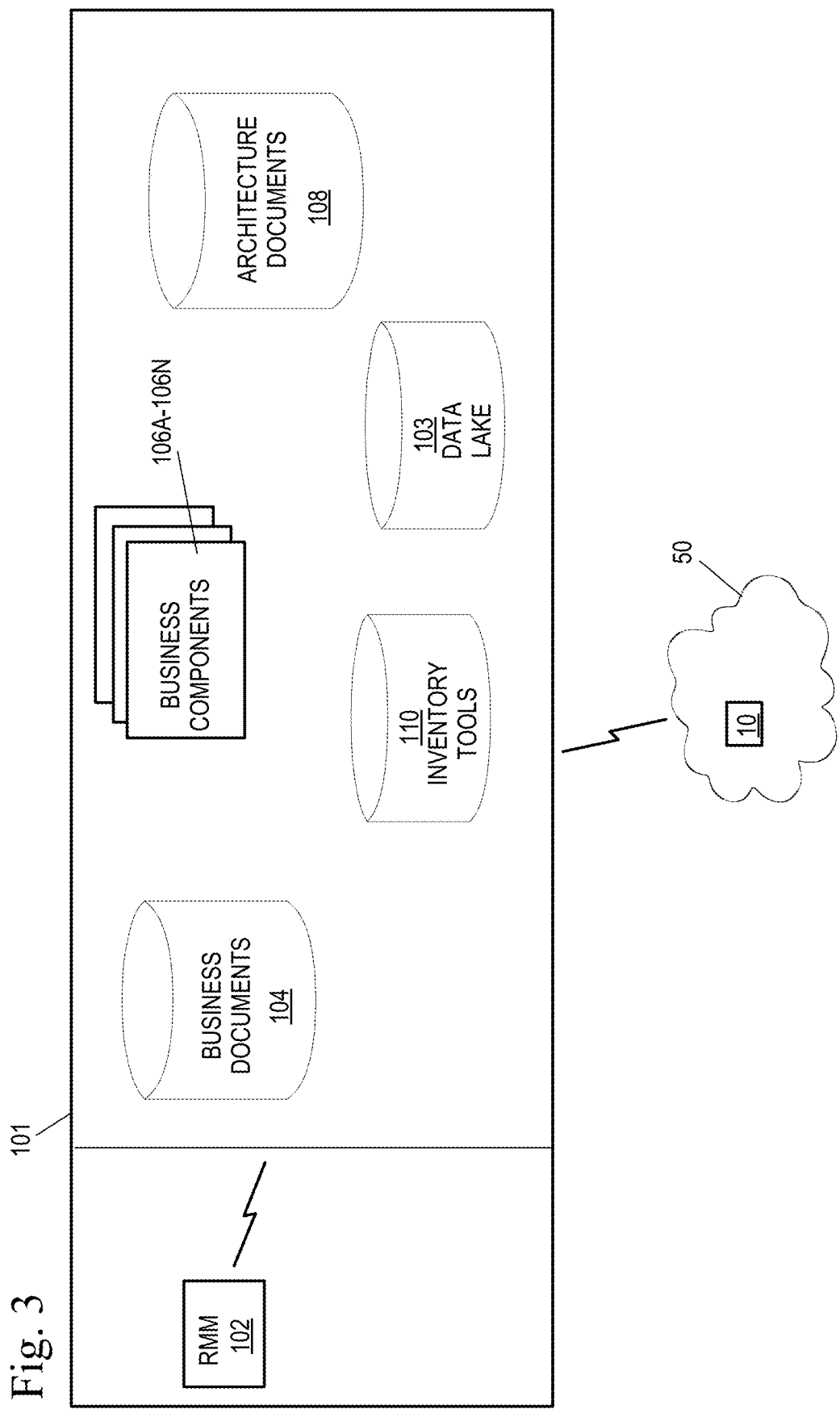
FIG. 3 shows a system architecture for computing resiliency of the hybrid IT environment.

FIG. 3 shows a system architecture for computing resiliency of the hybrid IT infrastructure environment.

The hybrid IT infrastructure environment 101 of the cloud infrastructure environment 50 can contain a resilience measurement module (RMM) 102 which is in communication with a cloud computing node 10 of the cloud infrastructure environment 50. The RMM 102 has access to business documents 104, a plurality of business components 106a-106n, architecture documents 108 of the component models of the hybrid IT infrastructure environment 50, a data lake 103, and inventory tools 110. The inventory tools 110 may include tools such as configuration tools, ticketing tools, discovery tools and any other tools that would aid in deriving and correlating system views and patterns around SPOFs.

A resilience measurement module (RMM) 102 ingests business documents 104, tags critical business components 106a-106n, assigns a business criticality index to business components, ingests architecture documents 108, obtains business-technical topology maps from inventory tools 110, and obtains access to the managed clouds 10 hosting the infrastructure 50.

Figure 9:
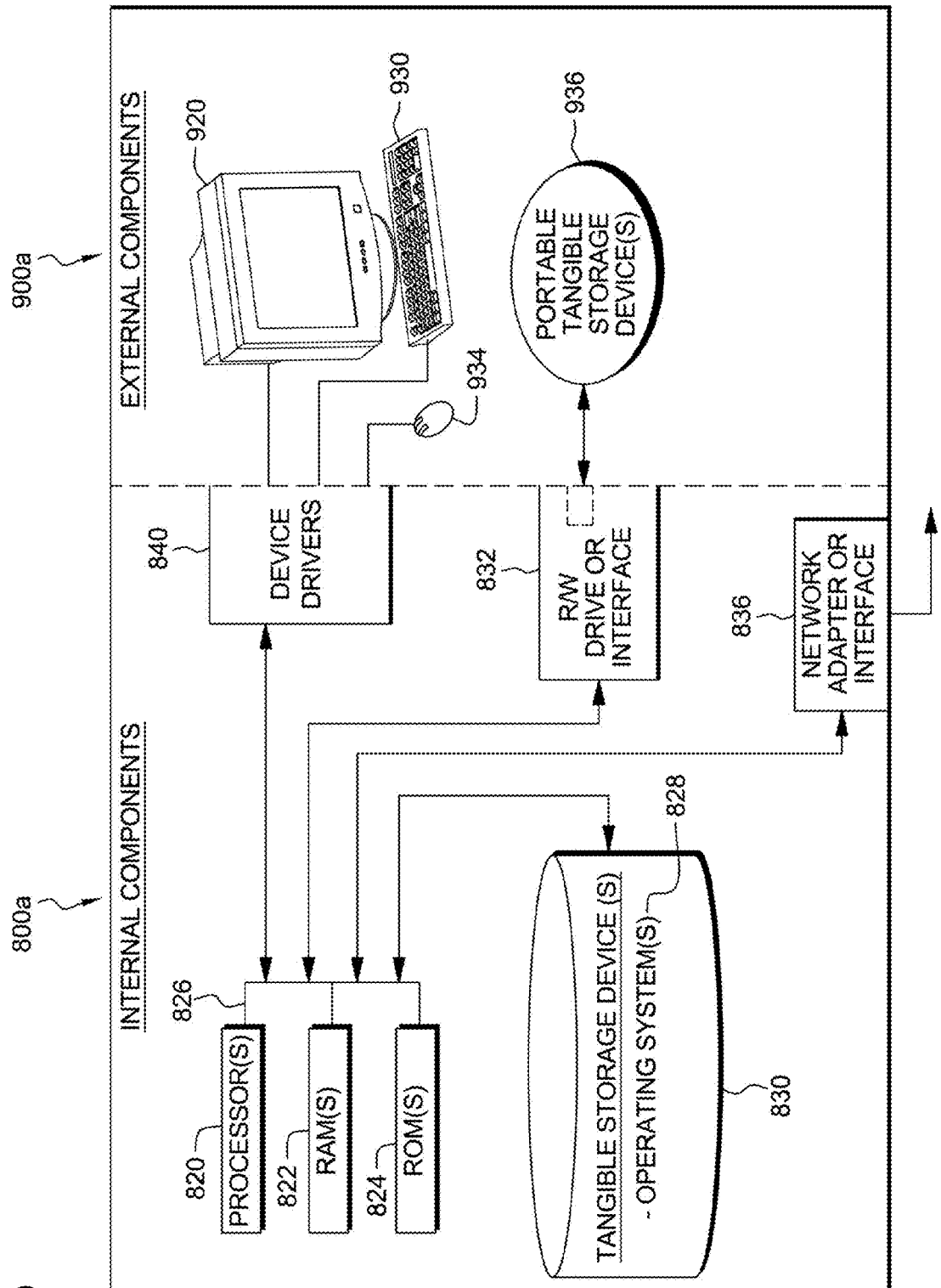
FIG. 9 depicts an exemplary diagram of a possible data processing environment in which illustrative embodiments may be implemented.

FIG. 9 illustrates internal and external components of components of the hybrid IT infrastructure environment. In FIG. 9, the components of the hybrid IT infrastructure environment, such as RMM 102, business components 106-106n, and inventory tools 110 include respective sets of internal components 800a and external components 900a. Each of the sets of internal components 800a includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 are stored on one or more of the computer-readable tangible storage devices 830 for execution by one or more of the processors 820 via one or more of the RAMs 822 (which typically include cache memory). In the embodiment illustrated in FIG. 9, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a also includes a R/W drive or interface 832 to read from and write to one or more portable computer-readable tangible storage devices 936 such as a CD-ROM, DVD, memory stick, magnetic tape, magnetic disk, optical disk or semiconductor storage device.

Each set of internal components 800a also includes a network adapter or interface 836 such as a TCP/IP adapter card. The network may comprise copper wires, optical fibers, wireless transmission, routers, firewalls, switches, gateway computers and/or edge servers.

Each of the sets of external components 900a includes a computer display monitor 920, a keyboard 930, and a computer mouse 934. Each of the sets of internal components 800a also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Figure 4:
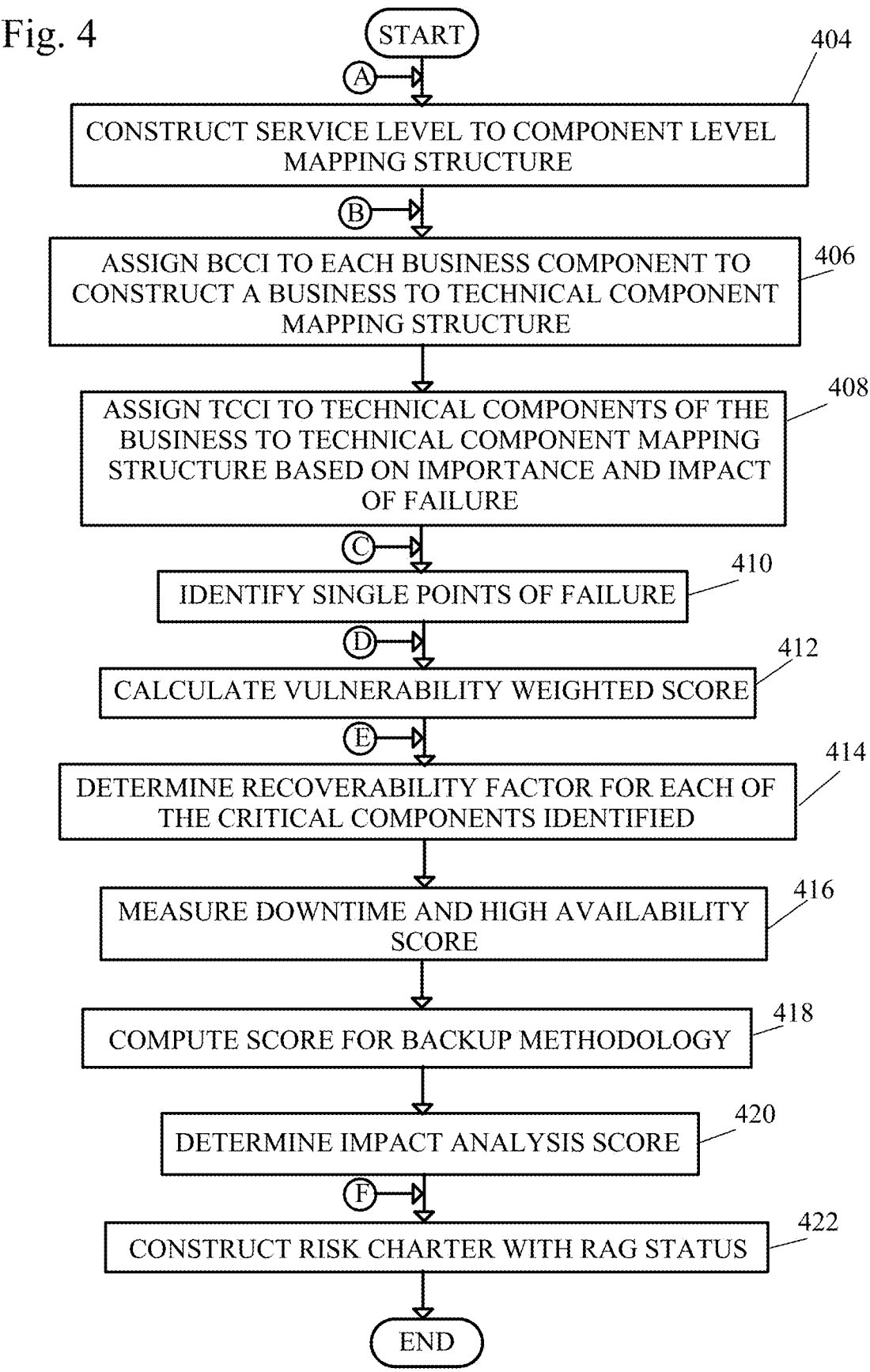
FIG. 4 shows a method of evaluating and measuring the resilience of a multi-site, multi-vendor hybrid IT environment.

FIG. 4 shows a method of evaluating and measuring the resilience of a multi-site, multi-vendor hybrid IT infrastructure environment.

In a first step, a RMM 102 constructs a service level (individual components) to component level mapping structure (step 404).

Figure 5:
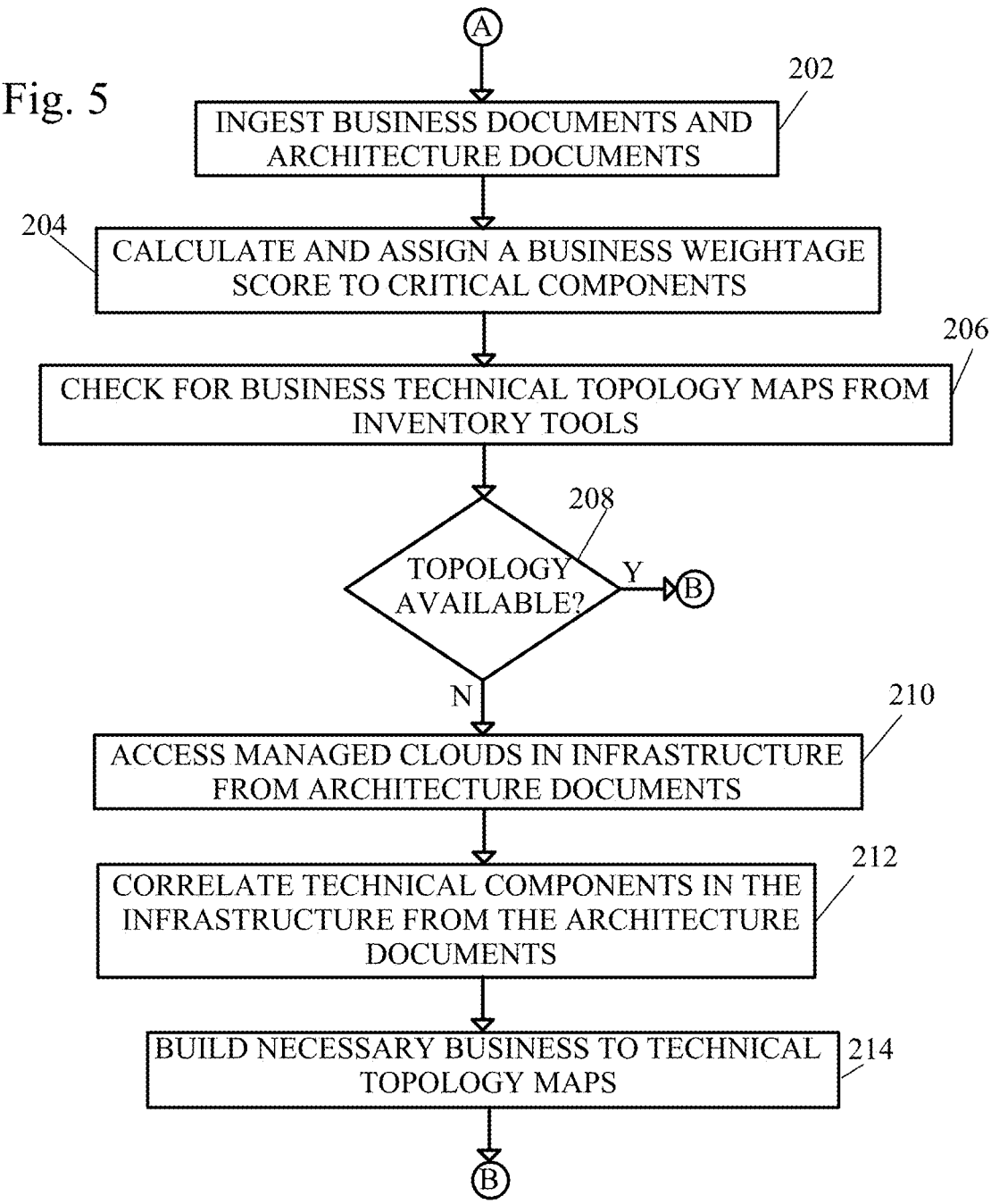
FIG. 5 shows a method of building a service level to component level mapping and business to technical component mapping.

Referring to FIG. 5, to construct the service level to component level mapping structure, the RMM 102 ingests business documents 104 and architecture documents 108 (step 202). Based on the documents ingested, the RMM 102 calculates and assigns a business weightage score to critical business components of the hybrid IT infrastructure environment (step 204). The RMM 102 then checks for business technical topology maps from inventory tools 110 (step 206). If a topology is not available (step 208), the RMM 102 obtains access to the managed clouds 10 hosting the infrastructure (step 210), correlates the technical components in the infrastructure from the architecture documents 109 (step 212), and builds the necessary business component to technical topology maps (step 214). If a topology is available (step 208), the method continues to step 406.

The RMM assigns a business component criticality index (BCCI) to each business component based on the business weightage score and tags of the critical business components to construct a business to technical component level mapping structure (step 406). The BCCI is based on dependency of other business components on it and its own business criticality. The BCCI additionally factors in business components within the infrastructure environment as well as the criticality of the components to the business functions through ingestion of architecture documents 109, including models of the components.

The RMM translates the BCCI into a technical component criticality index (TCCI) by assigning TCCI to technical components of the business to technical component level mapping structure based on their importance to the business and impact of its failure on other components (step 408).

The RMM identifies single points of failure (step 410). The single points of failure are identified from computers, servers, physical components, network/storage, virtualization layers/hypervisors, virtual machines and other components. The single points of failure are identified using the steps of the method of FIG. 6.

Figure 6:
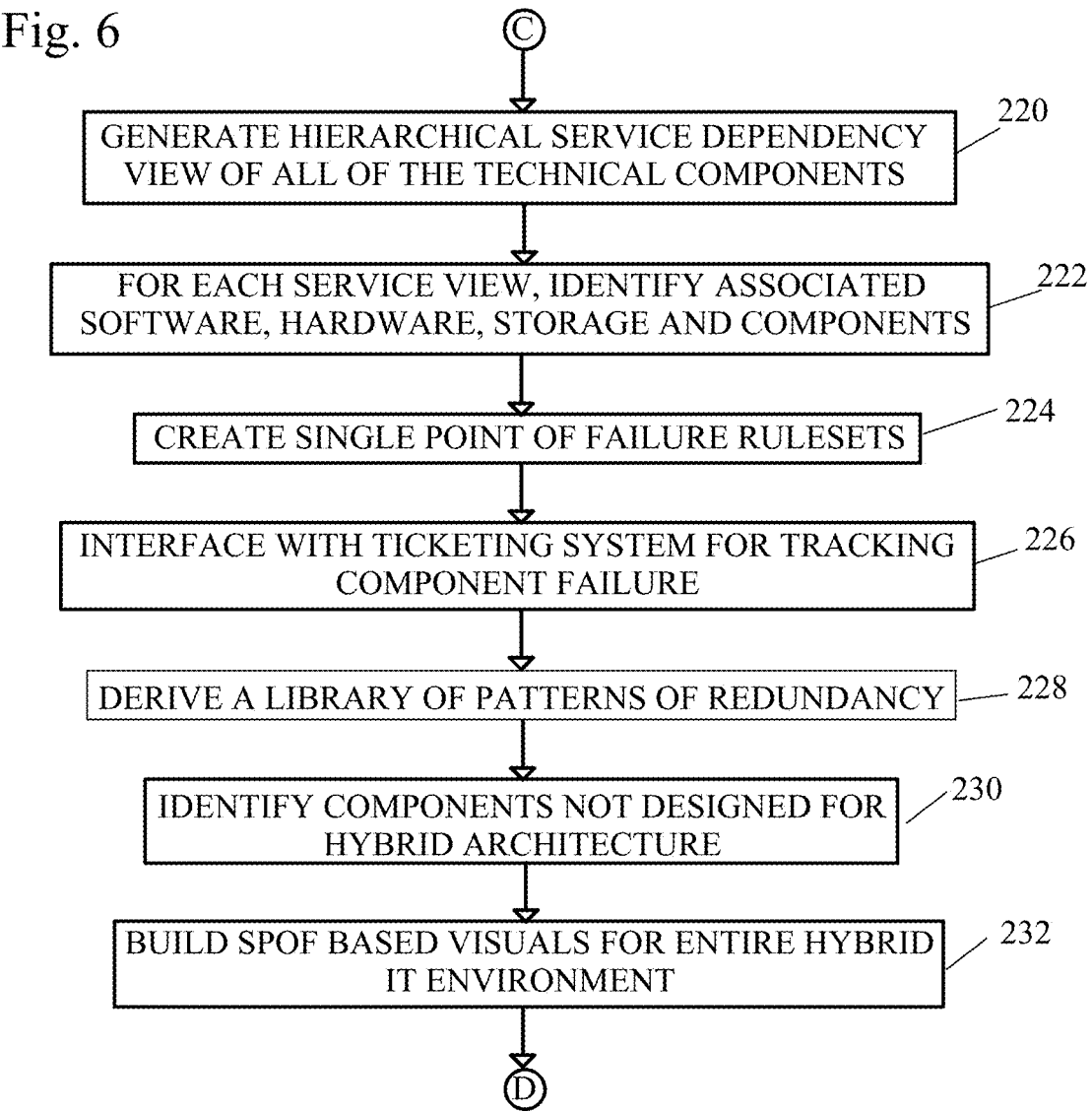
FIG. 6 shows a method of identifying failure points.

Referring to FIG. 6, the RMM 102 generates a hierarchical service dependency view of all of the technical components based on the BCCI and TCCI (step 220). For each service view, the RMM 102 identifies associated technical software, hardware, network storage and cloud components (step 222). The RMM 102 creates single point of failure (SPOF) rulesets for the network, storage, and components of the hybrid IT infrastructure environment (step 224).

In one embodiment, the SPOF ruleset can include the following rules: check for dual server configurations; check for dual virtual machine (VM) images; check for software/operating system (SW/OS) cluster configurations; check for multiple software instances in the same zone or server and check for duality in hypervisors and cloud controllers.

The RMM 102 then interfaces with a ticketing system of components for tracking failures of components (step 226). Based on the tracked failures, a library of patterns of redundancy are then derived for servers, VMs, network, software components, storage components, hardware components from the SPOF ruleset (step 228). The RMM 102 identifies components which are not designed for hybrid architecture environment (step 230) and the RMM 102 builds SPOF based visuals for the entire hybrid IT infrastructure environment (step 232) and the method continues to step 412.

Figure 7:
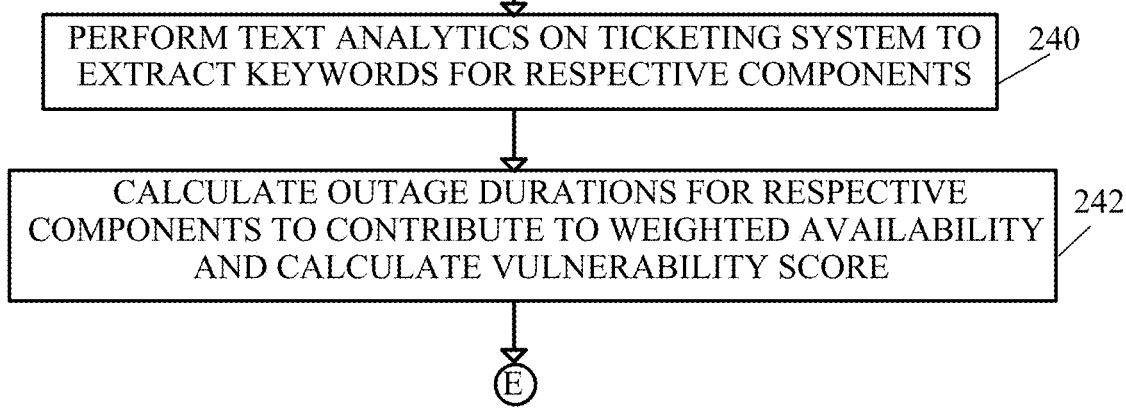
FIG. 7 shows a method of obtaining recoverability factors.

The RMM calculates an availability vulnerability weighted score to determine whether a site is multi-site, clustered within site, SPOF and vulnerabilities (step 412). The availability vulnerability weighted score is calculated by the method of FIG. 7. Referring to FIG. 7, the RMM 102 performs text analytics on the ticketing system to extract keywords for respective components/servers (step 240). The keywords extracted from the respective components/servers to extract the names of the various business and technical components from the ticket descriptions or ticket details from the inventory tools, such as the ticketing tools.

The outage durations for respective components/server are calculated and a weighted availability and vulnerability score is computed (step 242). The weighted availability and vulnerability score is computed as a function of i) criticality of the technical component; ii) component being a hosted single site, multi-site, clustered within site, SPOF, and vulnerability; and iii) past level of failures and outage durations for each software/hardware/network elements of a component.

The RMM 102 determines a recoverability factor for each of the critical components identified (step 414). The recoverability factor takes into account automated recovery, recover time and manual restart, which is obtained from the availability of all hardware and software components through utilization tools and previous history from the servers of the recycle times of each of the components.

The RMM 102 then measures downtime and high availability score as well as designed frequency within a time period to determine a performance vulnerability score (PVS) (step 416). The availability and downtime can be determined by monitoring tools and historical trends of components which have a regular breach of key performance indicators (KPI) within a set time period. The PVS is calculated by determining the function of: the total number of KPIs, KPIs breached during a peak time period, and frequency of breaches within a time period.

The RMM computes a backup vulnerability score based on backup methodology based on whether the backup is hot or cold (step 418). Hot backup, also known as dynamic or online backup, is a backup performed on data while the database is actively online and accessible to users. Cold backup is a physical backup performed on data while the database is not online or accessible to users. All files of the database are copied (image copy) and the data files do not change during the copy of the cold backup. The database of the cold backup is synced upon restore. Backup systems are preferably checked for previous, historically successful restorations The BVS is calculated as a function of success/failure of backups, success/failure of recoverability of each component from backups. The backup vulnerability score is calculated as function of success/failure of backups, success/failure of recoverability of each component from backups.

The RMM determines an impact analysis score (step 420). The impact analysis score measures the infrastructure resistance and immunity to failure/outages with an effort to meet minimum SLAs and performance characteristics. The impact analysis score involves all of the components across the entire hybrid IT infrastructure environment.

Figure 8:
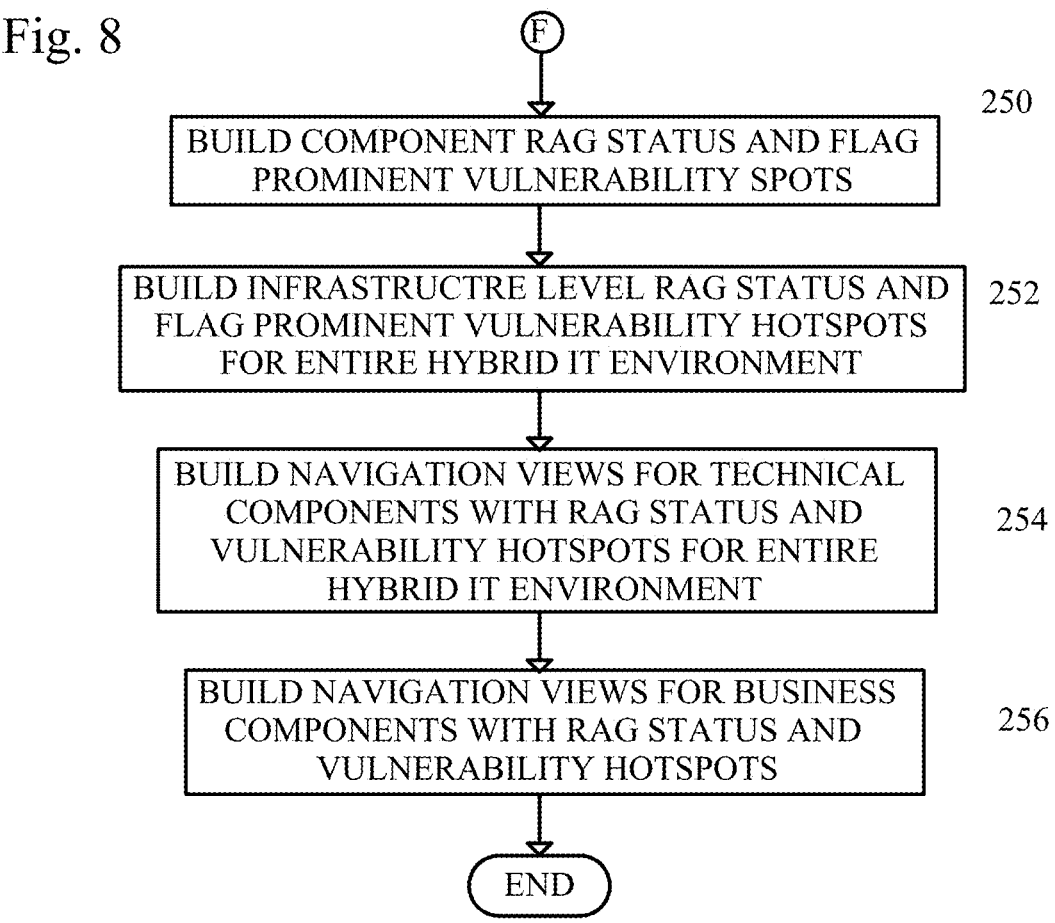
FIG. 8 shows a method of building a risk charter with RAG status.

The RMM constructs a risk charter with RAG status (step 422) and the method ends. FIG. 8 shows a method of constructing a risk charter with RAG status.

A component-wise red, amber or green (RAG) status is built and prominent vulnerability spots are flagged (step 250). The RAG status is based on a recoverability score, a monitoring vulnerability score and a resilience and vulnerability index. The recoverability score is based on the recoverability factors and is calculated as a cumulative function of time to recover each component from failure. The monitoring vulnerability score is calculated as a function of a total number of alerts for hardware, server, software, and/or cloud components. The resilience and vulnerability index is calculated as a function of weighted availability vulnerability score, recoverability score, performance vulnerability score, backup vulnerability score, and/or monitoring vulnerability score.

An infrastructure level RAG status is built and prominent vulnerability hotspots for the entire hybrid IT infrastructure environment are flagged (step 252). Navigation views for technical components with RAG status and vulnerability hotspots for the entire hybrid IT infrastructure environment is built (step 254) and then navigation views for business components with RAG status and vulnerability hotspots are built (step 256) and the method ends.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of evaluating and measuring resilience of a multi-site, multi-vendor hybrid information technology infrastructure environment using a resilience measurement module comprising the steps of:
   the resilience measurement module constructing a service level to component level mapping structure;
   the resilience measurement module assigning a business component criticality index to each business component of the hybrid information technology infrastructure environment to construct a business component to technical component mapping structure;
   the resilience measurement module assigning a technical component criticality index to technical components of the business component to technical component mapping structure based on importance and impact of failure of said components to identify critical technical components and critical business components to the hybrid information technology infrastructure environment;
   the resilience measurement module identifying single points of failure of the critical technical components and critical business components of the hybrid information technology infrastructure environment;
   the resilience measurement module calculating an availability vulnerability weighted score of the critical technical components and critical business components;
   the resilience measurement module determining a recoverability factor for each of the critical business components and critical technical components identified;
   the resilience measurement module measuring downtime and availability to determine a performance vulnerability score;
   the resilience measurement module computing a backup vulnerability score for backup methodology of the identified, critical business components and critical technical components;
   the resilience measurement module determining an impact analysis score; and
   the resilience measurement module constructing a risk charter with red, amber, and green status exhibiting the resilience of the hybrid information technology environment infrastructure.

2. The method of claim 1, wherein the step of the resilience measurement module constructing a service level to component level mapping structure further comprises the steps of the resilience measurement module:
   ingesting business documents and architecture documents of the hybrid information technology infrastructure environment;
   calculating and assigning a business weightage score to components of the hybrid information technology infrastructure environment;
   checking for business technical topology maps from inventory tools of the hybrid information technology infrastructure environment;
   when the business technical topology maps are not present, accessing managed clouds in infrastructure of the hybrid IT infrastructure environment from the architecture documents; and
   building necessary business to technical topology maps of the hybrid information technology infrastructure environment.

3. The method of claim 1, wherein the step of identifying single points of failure of the critical technical components and critical business components of the hybrid information technology infrastructure environment further comprises the steps of the resilience measurement module:
   generating a hierarchical service dependency view of all of the critical technical components of the hybrid information technology infrastructure environment;
   for each service dependency view:
      identifying associated software, hardware, storage and components comprising critical technical components and critical business components;
      creating a single point of failure ruleset;
      interfacing with a ticketing system for tracking critical component failure;
      deriving a library of patterns of redundancy within the hybrid information technology infrastructure environment;
      identifying critical components not designed for hybrid information technology infrastructure environment; and
      building single point of failure based visuals for the entire hybrid information technology infrastructure environment.

4. The method of claim 1, wherein calculating the availability vulnerability weighted score of the critical business components and the critical technical components comprises the steps of the resilience measurement module:
   performing text analytics on a ticketing system to extract keywords for respective critical components; and
   calculating outage durations for the respective critical components to contribute to weighted availability and the vulnerability weighted score.

5. The method of claim 1, wherein constructing risk charter with red, amber and green status exhibiting the resilience of the hybrid information technology environment infrastructure comprises the steps of the resilience measurement module:
   building a component red, amber, and green status and flagging prominent vulnerability spots;
   building an infrastructure level red, amber and green status and flagging prominent vulnerability hotspots for the entire hybrid information technology infrastructure environment;
   building navigation views for technical components with red, amber, and green status and vulnerability hotspots for the entire hybrid information technology infrastructure environment; and
   building navigation views for the business components with red, amber and green status and vulnerability hotspots.

6. The method of claim 1, wherein the availability vulnerability weighted score is calculated as function of criticality of the technical component, components hosting within a site, and past level of failures of technical components.

7. The method of claim 1, wherein the recoverability factor is calculated based on automated recovery, recover time and manual restart time and previous history of each of the components.

8. The method of claim 1, wherein the performance vulnerability score is calculated by determining a function of: a total number of key performance indicators, the key performance indicators breached during peak period and frequency of the breaches of the key performance indicators within a time period.

9. The method of claim 1, wherein the backup vulnerability score is calculated as a function of: successful backups, failed backups, success of recoverability of each component from backup and failure of recoverability of each component from backup.

10. A computer program product for evaluating and measuring resilience of a multi-site, multi-vendor hybrid information technology infrastructure environment using a resilience measurement module, the resilience measurement module comprising at least one processor, one or more memories, one or more computer readable storage media, the computer program product comprising a computer readable storage medium having program instructions embodied therewith, the program instructions executable by the computer to perform a method comprising:
   constructing, by the resilience measurement module, a service level to component level mapping structure;
   assigning, by the resilience measurement module, a business component criticality index to each business component of the hybrid information technology infrastructure environment to construct a business component to technical component mapping structure;
   assigning, by the resilience measurement module, a technical component criticality index to technical components of the business component to technical component mapping structure based on importance and impact of failure of said components to identify critical technical components and critical business components to the hybrid information technology infrastructure environment;
   identifying, by the resilience measurement module, single points of failure of the critical technical components and critical business components of the hybrid information technology infrastructure environment;
   calculating, by the resilience measurement module, an availability vulnerability weighted score of the critical technical components and critical business components;
   determining, by the resilience measurement module, a recoverability factor for each of the critical business components and critical technical components identified;
   measuring, by the resilience measurement module, downtime and availability to determine a performance vulnerability score;

computing, by the resilience measurement module, a backup vulnerability score for backup methodology of the identified, critical business components and critical technical components;

determining, by the resilience measurement module, an impact analysis score; and constructing, by the resilience measurement module, a risk charter with red, amber, and green status exhibiting the resilience of the hybrid information technology environment infrastructure.

11. The computer program product of claim 10, wherein the program instructions of the constructing, by the resilience measurement module, a service level to component level mapping structure further comprises the program instructions of the resilience measurement module:

ingesting business documents and architecture documents of the hybrid information technology infrastructure environment;

calculating and assigning a business weightage score to components of the hybrid information technology infrastructure environment;

checking for business technical topology maps from inventory tools of the hybrid information technology infrastructure environment;

when the business technical topology maps are not present, accessing managed clouds in infrastructure of the hybrid IT infrastructure environment from the architecture documents; and building necessary business to technical topology maps of the hybrid information technology infrastructure environment.

12. The computer program product of claim 10, wherein the program instructions of identifying single points of failure of the critical technical components and critical business components of the hybrid information technology infrastructure environment further comprises the program instructions of the resilience measurement module:

generating a hierarchical service dependency view of all of the critical technical components of the hybrid information technology infrastructure environment;

for each service dependency view:
identifying associated software, hardware, storage and components comprising critical technical components and critical business components;
creating a single point of failure ruleset;
interfacing with a ticketing system for tracking critical component failure;
deriving a library of patterns of redundancy within the hybrid information technology infrastructure environment;
identifying critical components not designed for hybrid information technology infrastructure environment; and
building single point of failure based visuals for the entire hybrid information technology infrastructure environment.

13. The computer program product of claim 10, wherein calculating the availability vulnerability weighted score of the critical business components and the critical technical components comprises the program instructions of the resilience measurement module:

performing text analytics on a ticketing system to extract keywords for respective critical components; and calculating outage durations for the respective critical components to contribute to weighted availability and the vulnerability weighted score.

14. The computer program product of claim 10, wherein constructing risk charter with red, amber and green status exhibiting the resilience of the hybrid information technology environment infrastructure comprises the program instructions of the resilience measurement module:

building a component red, amber, and green status and flagging prominent vulnerability spots;

building an infrastructure level red, amber and green status and flagging prominent vulnerability hotspots for the entire hybrid information technology infrastructure environment;

building navigation views for technical components with red, amber, and green status and vulnerability hotspots for the entire hybrid information technology infrastructure environment; and building navigation views for the business components with red, amber and green status and vulnerability hotspots.

15. The computer program product of claim 10, wherein the availability vulnerability weighted score is calculated as function of criticality of the technical component, components hosting within a site, and past level of failures of technical components.

16. The computer program product of claim 10, wherein the recoverability factor is calculated based on automated recovery, recover time and manual restart time and previous history of each of the components.

17. The computer program product of claim 10, wherein the performance vulnerability score is calculated by determining a function of: a total number of key performance indicators, the key performance indicators breached during peak period and frequency of the breaches of the key performance indicators within a time period.

18. The computer program product of claim 10, wherein the backup vulnerability score is calculated as a function of: successful backups, failed backups, success of recoverability of each component from backup and failure of recoverability of each component from backup.

19. A computer system for evaluating and measuring resilience of a multi-site, multi-vendor hybrid information technology infrastructure environment using a resilience measurement module comprising a computer comprising at least one processor, one or more memories, one or more computer readable storage media having program instructions executable by the computer to perform the program instructions comprising:

constructing, by the resilience measurement module, a service level to component level mapping structure;

assigning, by the resilience measurement module, a business component criticality index to each business component of the hybrid information technology infrastructure environment to construct a business component to technical component mapping structure;

assigning, by the resilience measurement module, a technical component criticality index to technical components of the business component to technical component mapping structure based on importance and impact of failure of said components to identify critical technical components and critical business components to the hybrid information technology infrastructure environment;

identifying, by the resilience measurement module, single points of failure of the critical technical components and critical business components of the hybrid information technology infrastructure environment;

calculating, by the resilience measurement module, an availability vulnerability weighted score of the critical technical components and critical business components;

determining, by the resilience measurement module, a recoverability factor for each of the critical business components and critical technical components identified;

measuring, by the resilience measurement module, downtime and availability to determine a performance vulnerability score;

computing, by the resilience measurement module, a backup vulnerability score for backup methodology of the identified, critical business components and critical technical components;

determining, by the resilience measurement module, an impact analysis score; and constructing, by the resilience measurement module, a risk charter with red, amber, and green status exhibiting the resilience of the hybrid information technology environment infrastructure.

20. The computer program product of claim 19, wherein the program instructions of the constructing, by the resilience measurement module, a service level to component level mapping structure further comprises the program instructions of the resilience measurement module:

ingesting business documents and architecture documents of the hybrid information technology infrastructure environment;

calculating and assigning a business weightage score to components of the hybrid information technology infrastructure environment;

checking for business technical topology maps from inventory tools of the hybrid information technology infrastructure environment;

when the business technical topology maps are not present, accessing managed clouds in infrastructure of the hybrid IT infrastructure environment from the architecture documents; and building necessary business to technical topology maps of the hybrid information technology infrastructure environment.

* * * * *